United States Patent
Bot et al.

(10) Patent No.: US 11,301,612 B1
(45) Date of Patent: Apr. 12, 2022

(54) METHOD AND APPARATUS FOR PREDICTING ELECTRICAL VALUES IN ELECTRONIC CIRCUITS

(71) Applicant: BQR Reliability Engineering Ltd., Rishon-Lezion (IL)

(72) Inventors: Yizhak Bot, Rishon-Lezion (IL); Alex Gonorovsky, Rishon-Lezion (IL); Isaac Rosenstein, Rishon-Lezion (IL)

(73) Assignee: BQR RELIABILITY ENGINEERING LTD., Rishon-Lezion (IL)

( * ) Notice: Subject to any disclaimer, the term of this patent is extended or adjusted under 35 U.S.C. 154(b) by 0 days.

(21) Appl. No.: 17/140,086

(22) Filed: Jan. 3, 2021

(51) Int. Cl.
*G06F 30/394* (2020.01)
*G06F 30/398* (2020.01)
*G06F 119/06* (2020.01)

(52) U.S. Cl.
CPC .......... *G06F 30/394* (2020.01); *G06F 30/398* (2020.01); *G06F 2119/06* (2020.01)

(58) Field of Classification Search
USPC ........................................................ 716/110
See application file for complete search history.

(56) References Cited

U.S. PATENT DOCUMENTS

| | | | |
|---|---|---|---|
| 2010/0180240 A1* | 7/2010 | Davis | G06F 30/3312 716/113 |
| 2018/0218096 A1* | 8/2018 | Yu | G06F 30/398 |
| 2020/0104457 A1* | 4/2020 | Chuang | G06N 20/00 |
| 2020/0104459 A1* | 4/2020 | Tong | G06F 30/327 |
| 2020/0364394 A1* | 11/2020 | Yu | G06F 30/27 |
| 2021/0287120 A1* | 9/2021 | Mamidi | G06N 5/003 |

* cited by examiner

*Primary Examiner* — Mohammed Alam
(74) *Attorney, Agent, or Firm* — The Roy Gross Law Firm, LLC; Roy Gross (57) ABSTRACT

A method, system and computer program product, the method comprising: obtaining circuit information of a portion of a circuit design, the circuit information specifying a plurality of electronic components and a plurality of nets connecting pins of components from the plurality of components, the portion of the circuit design thereby associated with a plurality of nodes comprising the pins and connection points, and one or more ground nodes connected to a ground net; obtaining a set of logical prediction rules and algorithms applicable to circuit designs; applying to the portion of the circuit design one or more applicable rules or algorithms from the set of logical prediction rules and algorithms, to obtain: a predicted potential of one or more nodes, and one or more electrical values for one or more electronic component; and outputting the predicted potential or the electrical values predicted for the electronic components.

18 Claims, 10 Drawing Sheets

METHOD AND APPARATUS FOR PREDICTING ELECTRICAL VALUES IN ELECTRONIC CIRCUITS

TECHNICAL FIELD

The present disclosure relates to designing electronic circuits in general, and to a method and apparatus for assisting a designer of electronic circuits in checking a design, in particular.

BACKGROUND

In order to start the design of a circuit, a specification needs to be received, which states the functionality that the finished design needs to provide. However, the specification does not indicate how this functionality is to be achieved. The specification is essentially a technical description of what the finished circuit has to achieve, and can include a variety of electrical requirements, such as the input and output signals of the circuit, the available power supplies, permitted power consumption, or the like. The specification can also set some physical parameters that the design must meet, such as size, weight, moisture resistance, temperature range, thermal output, vibration tolerance, acceleration tolerance, or the like.

The design process includes transforming the specification into a plan that contains all the information required for physically constructing the circuit. The process normally includes several stages.

First, the specification is converted into a block diagram of the various functions that the circuit must perform, at which stage the contents of each block are not considered, but only what the block does. This approach allows for breaking a possibly complicated task into smaller tasks which may be handled one after the other, or divided amongst members of a design team.

Each block may then be studied in more detail. In particular, the details of the electrical functions of the block are considered.

Then, the specific circuit components are chosen to carry out each function of the overall design. At this stage the physical layout comprising the electronic components, nodes and nets are also determined. This stage is usually done using a graphic user interface, in which the layout of the circuit is designed. Each component has associated properties, including for example recommended or required electric values or value ranges, such as voltage, current, power, or the like.

Typically, a design comprises a multiplicity of interconnected blocks, each of which may be implemented as a printed circuit board.

The layout may then be tested, wherein testing may include connectivity verification of the design, followed by electrical simulation.

The electrical simulation may start with unit testing in which each block is tested independently of other blocks, and followed by integration testing, in which two or more interconnected blocks are tested, such that the signals output by one block are input into another block.

Part of the electrical testing comprises determining the electrical potential of each node in the design, and the electrical values including voltage, current or power experienced by each component and connection.

Following testing and error correction, the resulting layout may be used for the production of a printed circuit board or Integrated circuit.

BRIEF SUMMARY

One exemplary embodiment of the disclosed subject matter is a computer-implemented method comprising: obtaining circuit information of at least a portion of a circuit design, the circuit information specifying a plurality of electronic components and a plurality of nets connecting pins of components from the plurality of components, the portion of the circuit design thereby associated with a plurality of nodes comprising the pins and connection points, and one or more ground nodes connected to a ground net; obtaining a set of logical prediction rules and algorithms applicable to circuit designs; applying to the portion of the circuit design one or more rules or algorithms applicable to the portion of the circuit design from the set of logical prediction rules and algorithms, to obtain: a predicted potential of one or more nodes, and one or more electrical values for one or more electronic component of the plurality of electronic components; and outputting the predicted potential or the electrical values predicted for the electronic components. The method can further comprise repeating said applying until a number of nodes from the plurality of nodes having undefined predicted potential is not reduced by said applying. Within the method, the rules or algorithms are optionally applied in predefined order. The method can further comprise assigning a zero potential to a component pin connected to the at least one ground node. Within the method, a rule from the set of logical prediction rules and algorithms optionally provides that a component pin connected to an input source or a component pin connected to a net including a connector pin that is connected to an input source is defined as having electric potential equal to a voltage of the input source. Within the method, a rule from the set of logical prediction rules and algorithms optionally provides that an input pin of a voltage regulator is defined as having electric potential equal to an input voltage. Within the method, a rule from the set of logical prediction rules and algorithms optionally provides that an output pin of a voltage regulator or a component pin connected to a net including an output pin of the voltage regulator is defined as having electric potential equal to an output voltage of the voltage regulator. Within the method, a rule from the set of logical prediction rules and algorithms optionally provides that a power pin of a power supply or a component pin connected to a net including a power pin of the power supply is defined as having electric potential equal to a power voltage. Within the method, a rule from the set of logical prediction rules and algorithms optionally provides that an input pin of a component or a component pin connected to a net including an input pin of the component is defined as having electrical potentials equal to an input voltage as stated in a data sheet of the component. Within the method, a rule from the set of logical prediction rules and algorithms optionally provides that an output pin of a component or a component pin connected to a net including an output pin of a component is defined as having electrical potentials equal to output voltage, as stated in a data sheet of the component. The method can further comprise parsing a name or technical data of a net for obtaining voltage value, and wherein a rule from the set of logical prediction rules and algorithms provides that a component pin connected to the net is defined as having electrical potential equal to the voltage value. Within the method, a rule from the set of logical prediction rules and algorithms optionally provides that a component having low resistance between two pins implies that the two pins have a same electrical potential. Within the method, a rule from the set of logical prediction rules and algorithms optionally provides for: calculating an electrical current through two pins of a component having known resistance therebetween, wherein a first pin of the two pins is connected to a net having assigned potential, by calculating other currents connected to pins of the net, and by assuming zero current balance of the net; and calculating a potential at the second pin using the electrical current. Within the method, a rule or algorithm from the set of logical prediction rules and algorithms optionally provides for calculating electrical power by multiplying current and voltage.

Another exemplary embodiment of the disclosed subject matter is a system having a processor, the processor being adapted to perform the steps of: obtaining circuit information of at least a portion of a circuit design, the circuit information specifying a plurality of electronic components and a plurality of nets connecting pins of components from the plurality of components, the at least portion of the circuit design thereby associated with a plurality of nodes comprising the pins and connection points, and one or more ground nodes connected to a ground net; obtaining a set of logical prediction rules and algorithms applicable to circuit designs; applying to the at least portion of the circuit design at least one rule or algorithm applicable to the at least portion of the circuit design from the set of logical prediction rules and algorithms, to obtain: a predicted potential of one or more nodes, and one or more electrical values for one or more electronic components of the plurality of electronic components; and outputting the predicted potential or the electrical values predicted for the electronic components. Within the system, the processor is optionally further adapted to repeat said applying until a number of nodes from the plurality of nodes having undefined predicted potential is not reduced by said applying. Within the system, a rule from the set of logical prediction rules and algorithms provides for one or more items selected from the group consisting of: a component pin connected to an input source or a component pin connected to a net including a connector pin that is connected to an input source is defined as having electric potential equal to a voltage of the input source; an input pin of a voltage regulator is defined as having electric potential equal to an input voltage; an output pin of a voltage regulator or a component pin connected to a net including an output pin of the voltage regulator is defined as having electric potential equal to an output voltage of the voltage regulator; a power pin of a power supply or a component pin connected to a net including a power pin of the power supply is defined as having electric potential equal to a power voltage; an input pin of a component or a component pin connected to a net including an input pin of the component is defined as having electrical potentials equal to an input voltage as stated in a data sheet of the component; and an output pin of a component or a component pin connected to a net including an output pin of a component is defined as having electrical potentials equal to output voltage, as stated in a data sheet of the component; and a component having low resistance between two pins implies that the two pins have a same electrical potential. Within the system, the processor is optionally further adapted to parse a name or technical data of a net for obtaining voltage value, and wherein a rule from the set of logical prediction rules and algorithms provides that a component pin connected to the net is defined as having electrical potential equal to the voltage value. Within the system, the a rule from the set of logical prediction rules and algorithms optionally provides for: calculating an electrical current through two pins of a component having known resistance therebetween, wherein a first pin of the two pins is connected to a net having assigned potential, by calculating other currents connected to pins of the net, and by assuming zero current balance of the net; and calculating a potential at the second pin using the electrical current.

Yet another exemplary embodiment of the disclosed subject matter is a computer program product comprising a non-transitory computer readable medium retaining program instructions, which instructions when read by a processor, cause the processor to perform a method comprising: obtaining circuit information of at least a portion of a circuit design, the circuit information specifying a plurality of electronic components and a plurality of nets connecting pins of components from the plurality of components, the at least portion of the circuit design thereby associated with a plurality of nodes comprising the pins and connection points, and at least one ground node connected to a ground net; obtaining a set of logical prediction rules and algorithms applicable to circuit designs; applying to the at least portion of the circuit design one or more rules or algorithms applicable to the at least portion of the circuit design from the set of logical prediction rules and algorithms, to obtain: a predicted potential of at least one node, and at least one electrical value for at least one electronic component of the plurality of electronic components; and outputting the predicted potential or the at least one electrical value predicted for the at least one electronic component.

THE BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The term "block" or "board" used in this specification should be expansively construed to cover the design of any kind of a collection of components performing one or more functions. Once the design and testing is completed, a block or a board may be implemented as a printed circuit board (PCB). A PCB mechanically supports and electrically connects electrical or electronic components using conductive tracks, pads and other features etched from one or more sheet layers of copper laminated onto and/or between sheet layers of a non-conductive substrate. Components are generally soldered onto the PCB to both electrically connect and mechanically fasten them to it.

The term "Net" used in this specification should be expansively construed to cover any kind of electric net, i.e., a node connecting one or more elements in an electronic circuit. A net may connect components within a same block, or a component of a block to a connector which may connect to another block.

The term "electrical values" used in this specification should be expansively construed to cover any kind of electrical value, also referred to as stress, that may be predicted, measured or otherwise associated with a node, a component, or the like, such as but no limited to potential, voltage, current, and power.

One technical problem dealt with by the disclosed subject matter relates to predicting or determining the expected electrical values over nodes and components of a designed circuit, in order to validate that they are in compliance with the data sheets of the components or with other limitations, will not misfunction, and will not be harmed or cause harm by the operation of the circuit.

Traditional methods for this validation includes a physical simulation of the circuit, including introducing mathematical expressions that describe the behavior of each component and the inter-relations between components.

The physical validation is a very labor intensive and error-prone process, which also requires significant computing resources. In addition, it is subject to change whenever the circuit design changes, and is thus less suitable for ongoing verification during the board design process. Therefore, it is traditionally employed towards the end of the circuit design process, when changes are harder and more expensive to make, thus delaying the time to market of the circuit.

Thus, it is required to provide a method and apparatus for simulating the electrical values within a circuit in a manner that does not require significant work by the designer, but rather derives the required data and flow from the circuit design or from other available computerized sources.

One technical solution of the disclosure relates to applying a set of rules for deducing electrical potentials at nodes. The set of rules may relate to connections or connectors or the like. When the potential of a node becomes known, the potential of further nodes connected thereto, directly or indirectly may be obtained.

Further rules provide for deducing potential at nodes connected to voltage regulators and to power supplies.

Yet further rules may relate to obtaining the potential at nodes from parsing names assigned to nets, wherein the names are constructed in a predetermined manner that implies the voltage. Additional data required for applying rules may be obtained from the circuit design, from data sheets of the components, or the like.

Yet further rules may relate to applying known physical laws, such as Ohm's law and Kirchhof's laws, to obtain further electrical values such as current or power for specific nodes or components.

The rules may be applied in a predetermined manner, starting for example with rules related to known voltage, such as power sources, the output of voltage regulators, or the like, and continuing to apply further rules.

Another technical solution relates to iteratively applying the set of rules. A rule applied at a first node may provide for determining an electrical value at a second node. However a rule applicable to the second node and which may be helpful in determining the potential at a third node may have been applied earlier, and will thus not take effect after the value at the second node becomes known. Thus, repeatedly applying the set of rules, until no change is observed and no new information is obtained, provides for propagating the available data to all reachable locations within the circuit.

One technical effect of the disclosure relates to providing a method and system for automatic prediction of electrical values in a circuit being designed. The rules may be defined once and applicable to a plurality of circuits. The rules may be defined by a third party and used by any circuit designer without further preparations. Thus, no specific preparation is required for applying the prediction, Another technical effect of the disclosure relates to evaluating or predicting the electrical values on the different components at various development stages of the design, without having to complete the design first. Since operating the prediction does not require significant labor from the designer, the prediction may be performed often throughout the design process, thus detecting problems at an early stage, when correction is simpler and cheaper.

Figure 1:
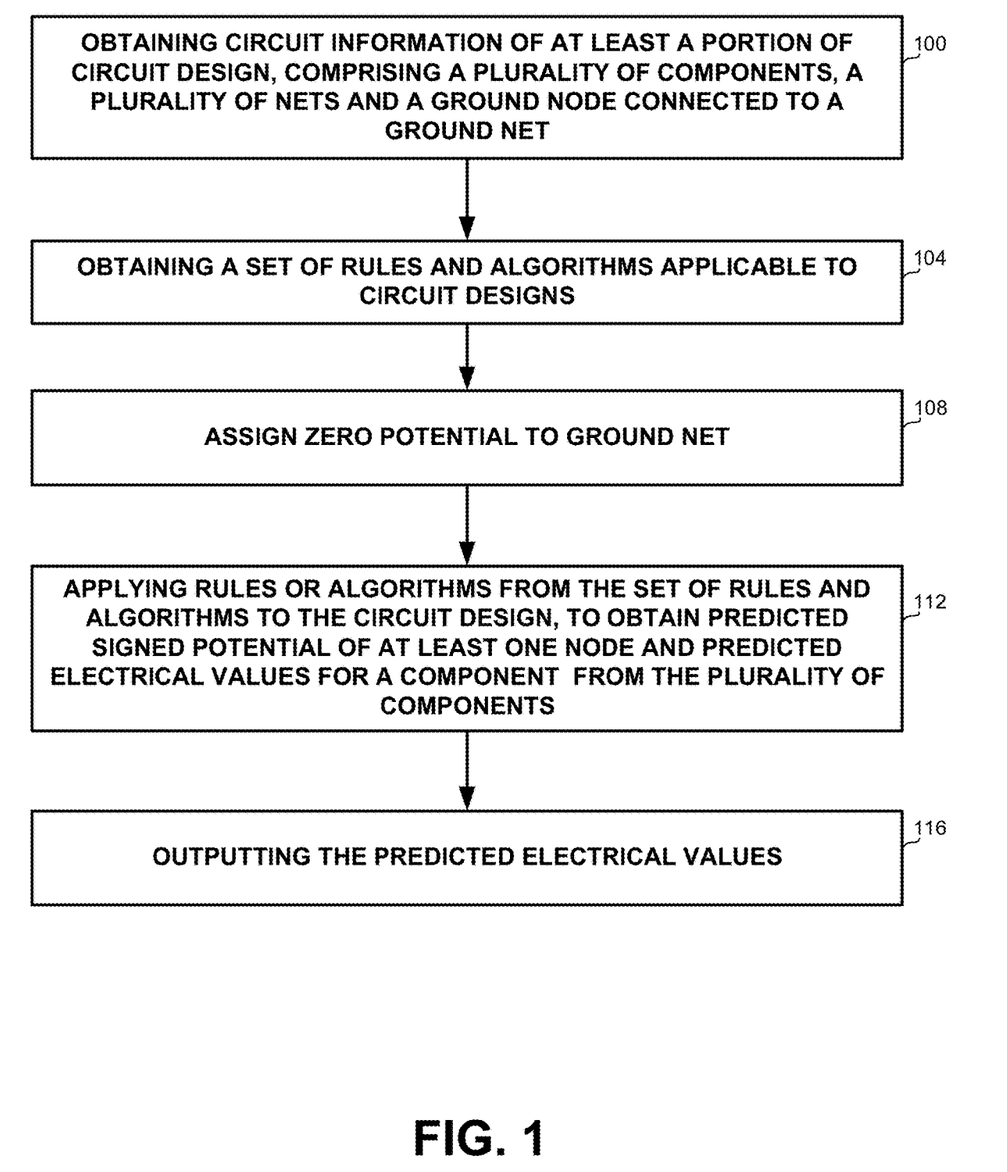
FIG. 1 shows a flowchart of steps in a method for determining potential and electrical values in a circuit design, in accordance with some embodiments of the disclosure.

Referring now to FIG. 1, showing a flowchart of steps in a method for determining potential and electrical values in a circuit design, in accordance with some embodiments of the disclosure.

On step 100, circuit information may be received. The circuit information may comprise at least a portion of a circuit design, and may specify a plurality of electronic components and connectors within the system, and a plurality of nets connecting pins of the components. The information thus contains a plurality of nodes comprising the components pins and connection points. The information may comprise a ground net and one or more ground nodes connected to the ground net.

On step 104, a set of rules and algorithms applicable to circuit design and used for predicting electrical values may be received. The set of rules and algorithms may be a super set that may comprise one or more rules which are inapplicable to one or more designs, but generally at least some applicable rules may have applicability to any electronic circuit. The rules and algorithms are logical, and may derive the required data from the specific parameters of the circuit components, such as voltages, resistance or the like. The rules and algorithms may propagate values through the circuit, and are thus simple and suitable for initial analysis of the circuit, rather than involve physical models of the components.

Some exemplary rules are detailed in association with FIGS. 2-10 below.

On step 108, zero potential may be assigned to the ground net. This assignment may provide a starting point for determining potential for the nodes connected thereto, and consequentially to further nodes.

On step 112, a plurality of rules or algorithms from the set of rules and algorithms may be applied to the circuit design, to obtain predicted potential of at least one node. From the predicted potential and additional data, one or more additional electrical values may be predicted for one or more components of the circuit may be obtained as well.

The rules and algorithms, and application thereof is further detailed in association with FIGS. 2-10 below.

On step 116, the predicted electrical values, such as the potentials, currents, and power may be output to a user, for example in a form of a textual table, in a proprietary format, displayed over a display device, exported to a file or the like. In some embodiments, only values exceeding or otherwise different from required or recommended values or ranges may be reported.

In some embodiments, the method may be operated by an automatic tool every predetermined period of time, after a predetermined number of changes or component additions, or with any other condition being held, and raise an alert if one or more of the values differs form a recommended or required value, or deviates from a recommended or required range.

Figure 2:
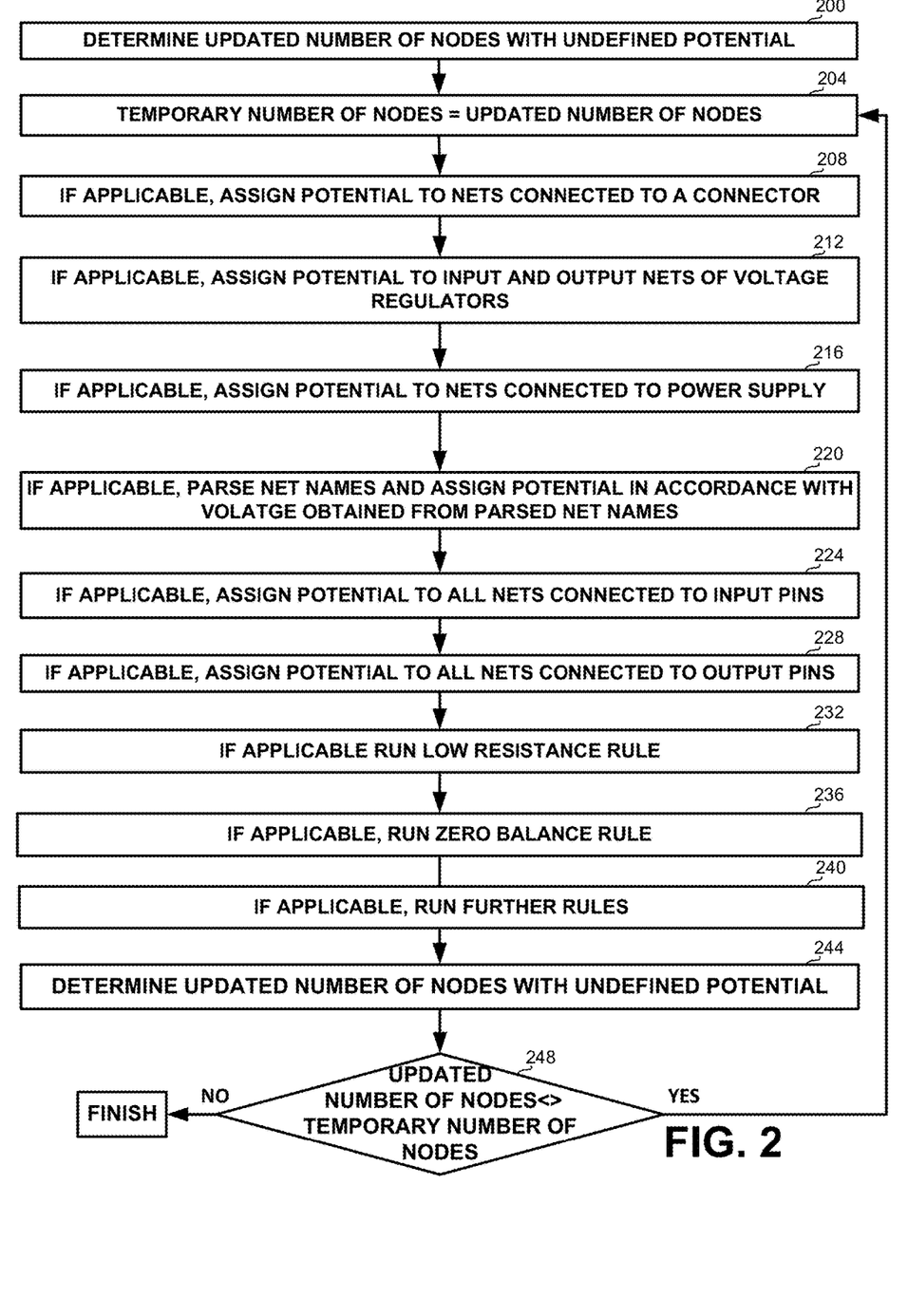
FIG. 2 shows a flowchart of steps in a method for applying rules for predicting electrical values in a circuit design, in accordance with some exemplary embodiments of the disclosed subject matter.

Referring now to FIG. 2, showing a flowchart of steps in a method for applying rules for predicting electrical values in a circuit design, in accordance with some exemplary embodiments of the disclosed subject matter. FIG. 2 thus provides an exemplary embodiment of step 112 of FIG. 1.

On step 200 the number of nodes within the circuit for which the potential is undefined may be obtained. This number may initially be equal to the total number of nodes within the circuit, excluding the nodes connected to the ground net.

On step 204, a variable containing a temporary number of nodes having undefined potential may be set to be equal to the number computed on step 200.

On step 208, if applicable, i.e., if there are nodes connected to a connector, wherein the potential of a pin within the connector is known, a connector rule is applied in which the same potential is assigned to all nodes connected to each pin for which the potential is known.

Figure 3A:
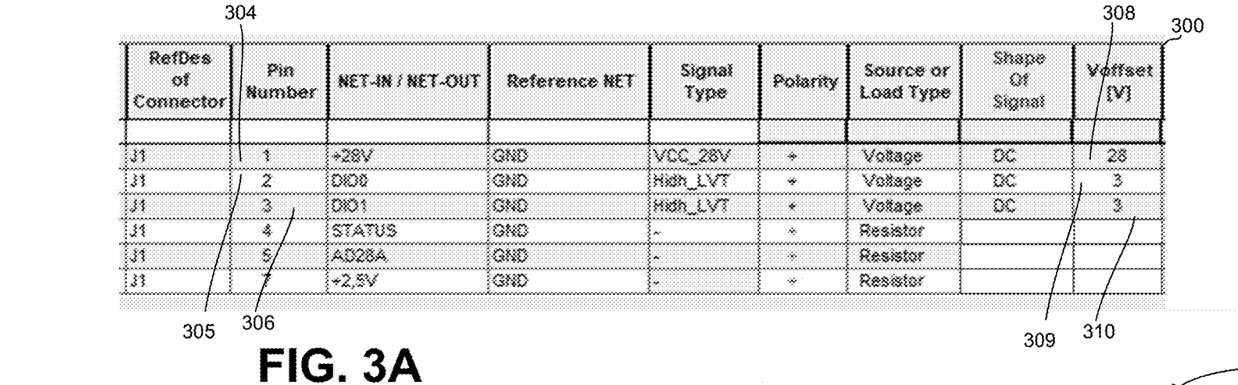
FIG. 3A shows a table and FIG. 3B shows a circuit fragment demonstrating application of the connector rule, in accordance with some exemplary embodiments of the disclosed subject matter.
Figure 3B:
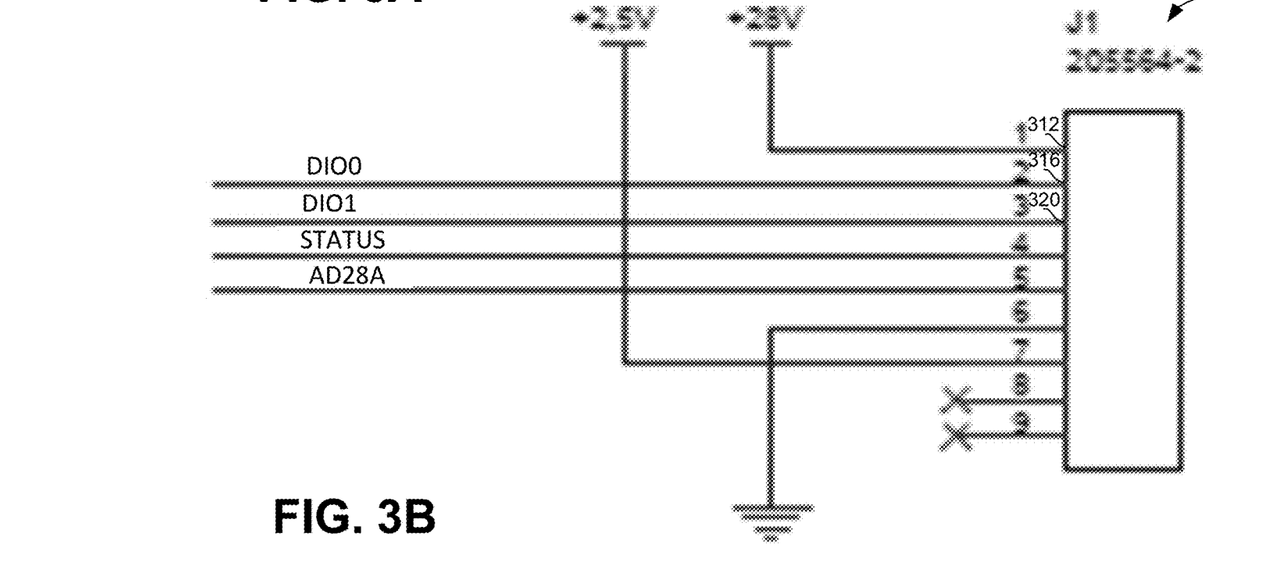

Referring now to FIGS. 3A and 3B, showing an example of the application of the connector rule. FIG. 3A shows a table 300 defining the pins of a connector J1, and FIG. 3B shows a corresponding fragment 302 of the circuit comprising connector J1.

As indicated by the first line of table 300, pin 1 (304) of connector J1 belongs to the potential net of +28V and thus has a potential difference of 28V (308) from the ground. Similarly, pin 2 (305) and pin 3 (306) belong to the potential nets of DIO0 and DIO1, respectively, and thus have a potential difference of 3V (309 and 310, respectively) from the ground.

Applying this rule provides for pin 1 (312) of connector J1 being assigned a potential of 28V, and for pins 2 (316) and 3 (320) being assigned a potential of 3V.

On step 212, if applicable, i.e., if there are voltage regulators in the circuit, then the input pins of the voltage regulators are defined to have electrical potential equal to the designated input voltage. Furthermore, component pins connected to nets that include the voltage regulators input pins, are also assigned to have the same electric potential as the input pins.

The output pins of the voltage regulators are defined as having electrical potentials equal to the output voltage of the voltage regulators, as obtained for example from a datasheet of the voltage regulator, or provided by a designer as part of the circuit design. Similarly, component pins connected to nets that include the voltage regulators output pins are also assigned to have the same electric potential as the output pins.

Figure 4A:
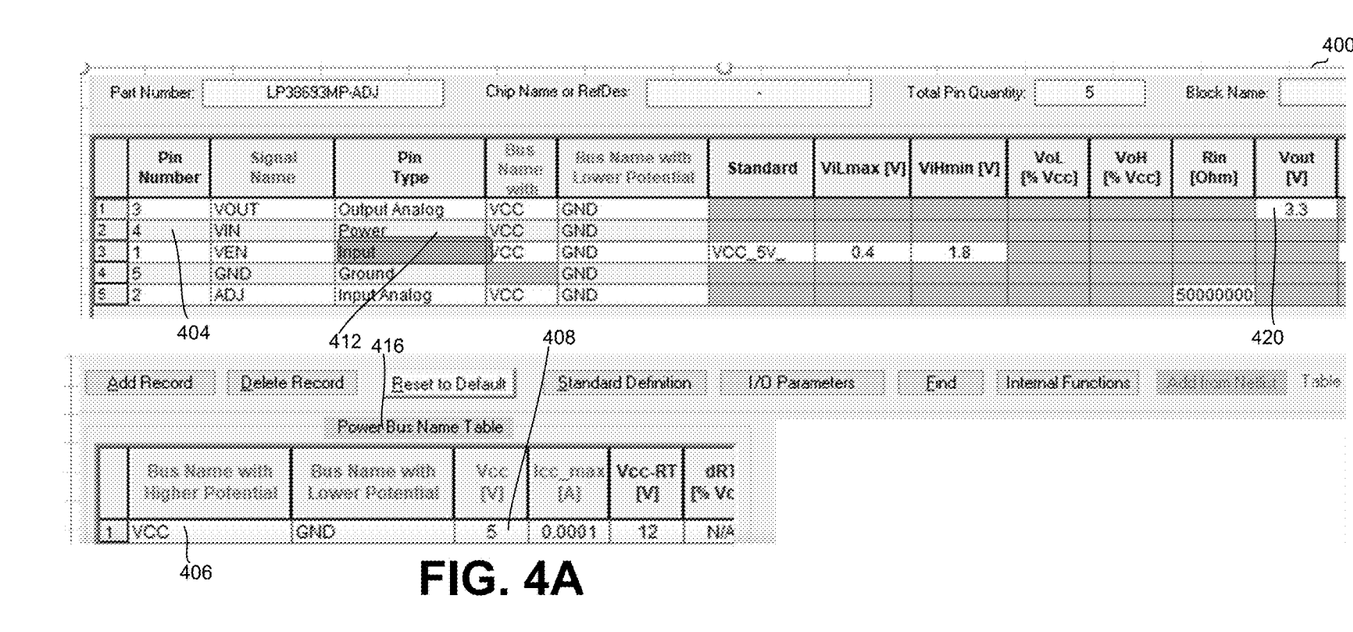
FIG. 4A shows a table and FIG. 4B shows a circuit fragment demonstrating application of a voltage regulator rule, in accordance with some exemplary embodiments of the disclosed subject matter.
Figure 4B:
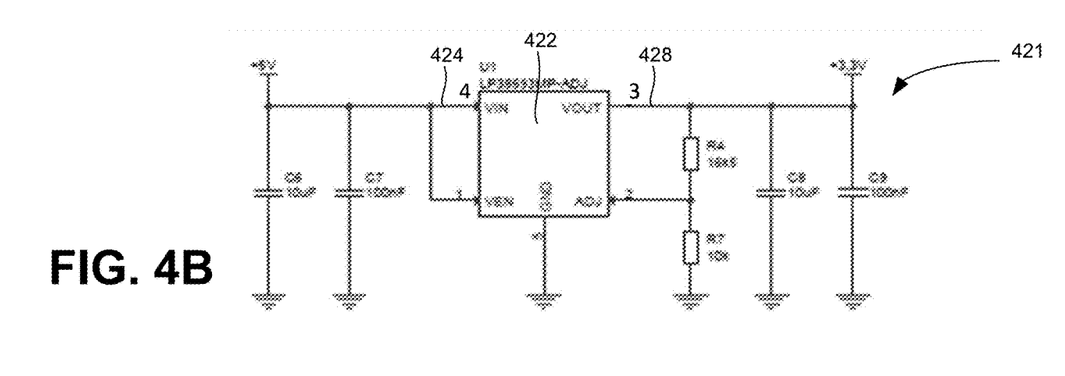

Referring now to FIGS. 4A and 4B, showing an example of the application of the voltage regulator rule. FIG. 4A shows a table 400 defining the pins of a voltage regulator and table 416 showing the power bus name table, and FIG. 4B shows a corresponding fragment 421 of the circuit.

The description of pin 4 (404) which is an input pin of the voltage regulator is of type "Power" 412, and is thus associated with bus name with higher potential VCC (406) of power bus name table 416 and its potential is 5V (408) as shown in the table.

The description of pin 3 (420) indicates that it is an output pin of the voltage regulator, and has an out voltage of 3.3V.

Applying the voltage regulator rule provides for pin 4 (424) of voltage regulator 422 being assigned a potential of 5V as indicated by 408, and pin 3 (428) which is the output of the is assigned a value of 3.3V.

On step 216, if applicable, i.e., if there are power suppliers in the circuit, then the power pins of the power suppliers are defined to have electrical potential equal to the power voltage of the power supplier, as may be obtained from a data sheet of the power supplier. Furthermore, component pins connected to nets that include the power suppliers input pins, are also assigned to have the same electric potential as the input pins.

Figures 5A, 5B:
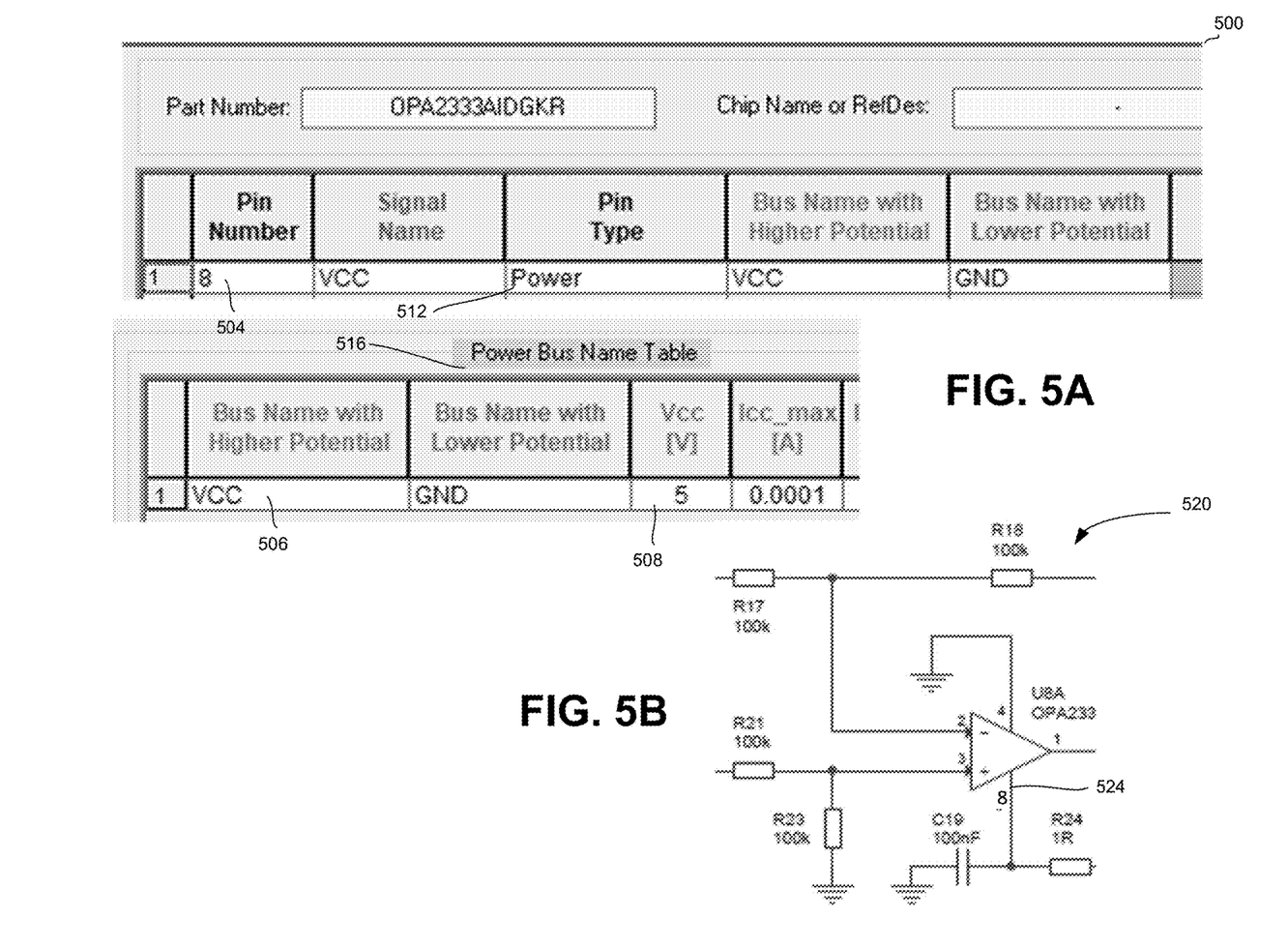
FIG. 5A shows a table and FIG. 5B shows a circuit fragment demonstrating application of a power supplier rule, in accordance with some exemplary embodiments of the disclosed subject matter.

Referring now to FIGS. 5A and 5B, showing an example of the application of the power supplier rule. FIG. 5A shows a table 500 defining one pin of a power supplier, and table 516 showing the power bus name table, and FIG. 5B shows a corresponding fragment 520 of the circuit.

The description of pin 8 (504) which is of type "Power" 512, is thus associated with bus name with higher potential VCC (506) of power bus name table 516, and its potential is +5V (508).

Applying the power supplier rule provides for pin 8 (524) of the power supplier being assigned a potential of +5V as indicated by 508. The same rules can be applied towards further pins of the power supply.

On step 220, if applicable, i.e., if there are nets having names of a predetermined format, then the net names may be parsed to obtain the relevant voltage, which may then be assigned to the net nodes. The parsing may be specific to the naming scheme used, in order to extract the voltage. In some embodiments, the net names may comply with a regular expression having predefined structure and predefined separators.

Figure 6A:
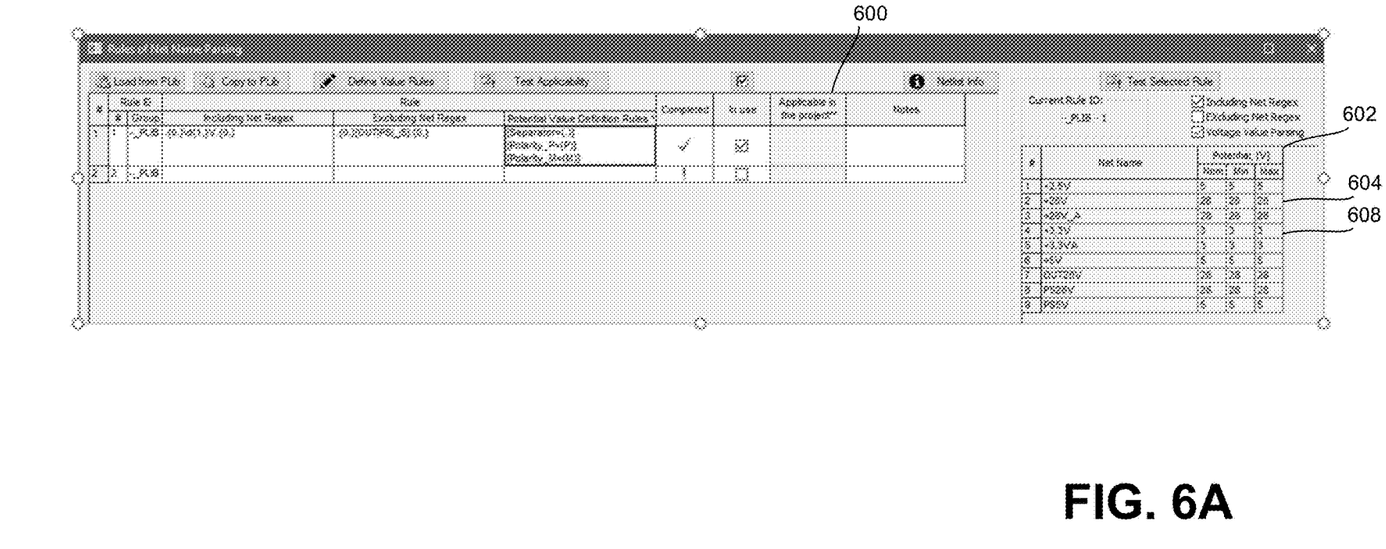
FIG. 6A shows a table and FIG. 6B shows a circuit fragment demonstrating application of net parsing, in accordance with some exemplary embodiments of the disclosed subject matter.
Figure 6B:
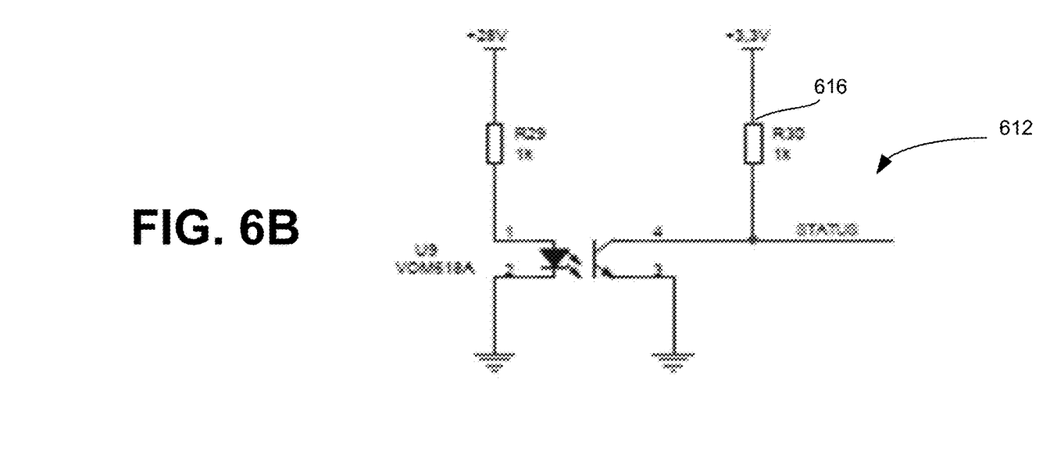

Referring now to FIGS. 6A and 6B, showing an example of the application of the net parsing. FIG. 6A shows a table 600 defining the net naming convention, and table 602 showing a plurality of net names, including "+28V" associated with a voltage of 28V (604) and "+3.3V" associated with a voltage of 3V (608).

FIG. 6B shows a corresponding fragment 612 of the circuit, in which a potential of 28V relative to the ground is assigned to all nodes of the "+28V", and a potential of 3V relative to ground is assigned to all nodes of the "+3.3V", such as node 616. Further details of naming nets are disclosed in U.S. patent Ser. No. 10/726,176, filed May 15, 2019 and titled "Method and Apparatus for Designing Electrical and Electronic Circuits", incorporated herein in its entirety for all purposes.

On step 224, if applicable, i.e., if there are components with inputs pins within the circuit, then the input pins of the circuit are defined to have electrical potential equal to the input voltage. Furthermore, component pins connected to nets that include the input pins, are also assigned to have the same electric potential as the input pins.

Figure 7A:
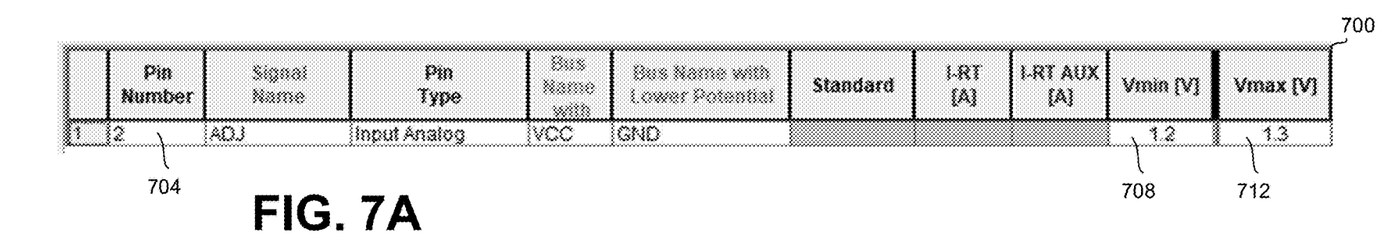
FIG. 7A shows a table and FIG. 7B shows a circuit fragment demonstrating application of an input pins rule, in accordance with some exemplary embodiments of the disclosed subject matter.
Figure 7B:
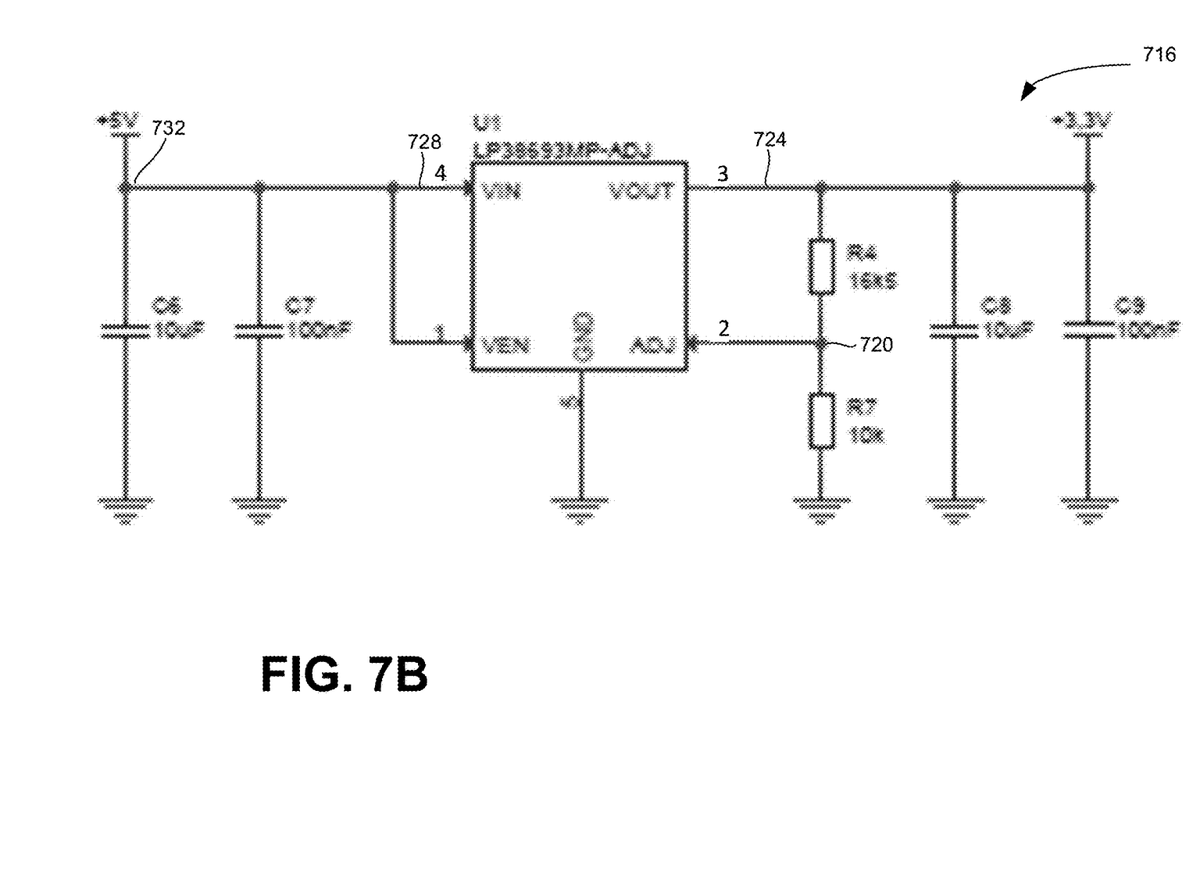

Referring now to FIGS. 7A and 7B, showing an example of the application of the input pin rule. FIG. 7A shows a table 700 defining an input pins, and FIG. 7B showing a corresponding fragment 716 of the circuit.

The description of pin 2 (704) which is of type "Input Analog", indicates that its potential is between a minimum of 1.2V (708) and a maximum of 1.3V (712).

Applying the input pin rule provides for pin 2 (720) of the input analog component being assigned a potential of between Vmin=1.2V and Vmax=1.3V Pin 4 (728) is connected to node 732 and is thus also assigned a value of 5V.

On step 228, if applicable, i.e., if there are components with output pins within the circuit, then the output pins are defined to have electrical potential as derived from the component definition. Furthermore, component pins connected to nets that include the output pins, are also assigned to have the same electric potential as the output pins.

Figure 8A:
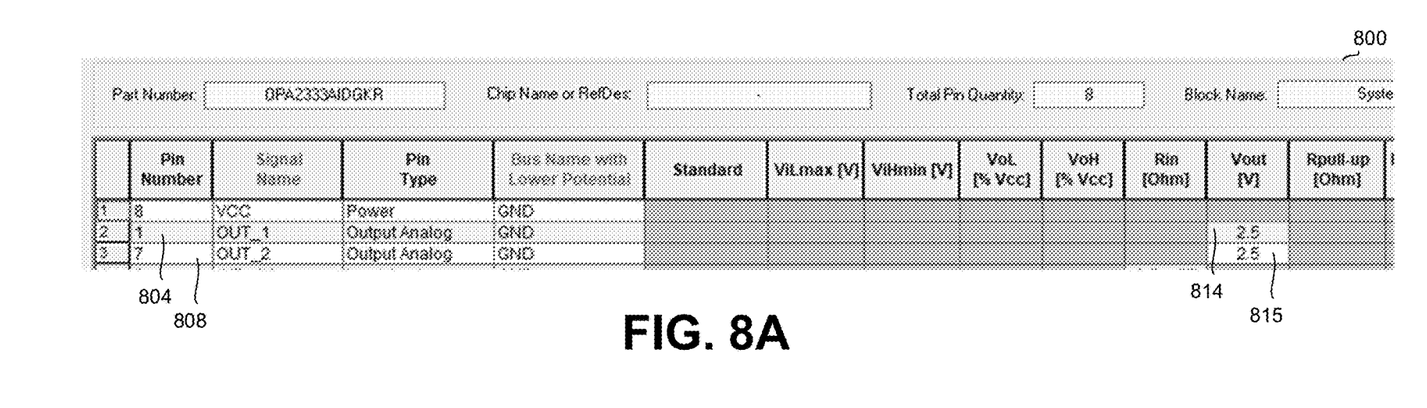
FIG. 8A shows a table and FIG. 8B shows a circuit fragment demonstrating application of an output pins rule, in accordance with some exemplary embodiments of the disclosed subject matter.
Figure 8B:
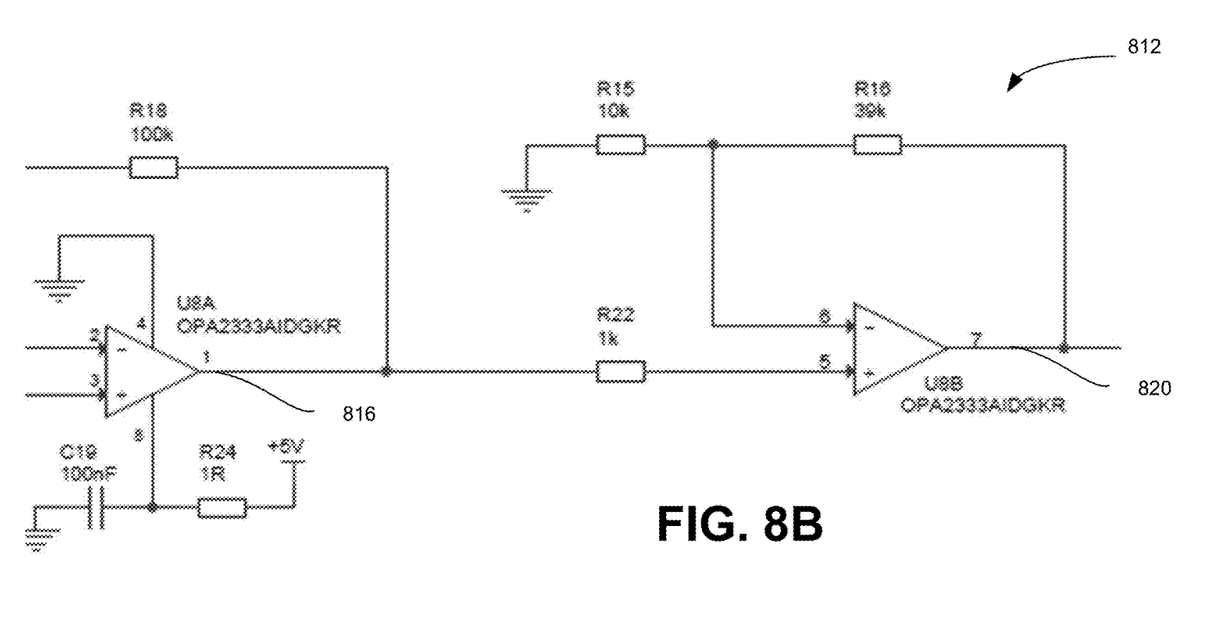

Referring now to FIGS. 8A and 8B, showing an example of the application of the input pin rule. FIG. 8A shows a table 800 comprising the description of output pin 1 (804) and the description of output pin 7 (808), both having out voltage of 2.5V (814, 815). FIG. 8B shows a corresponding fragment 812 of the circuit.

Applying the output pin rule provides for assigning a potential of 2.5V to pin 1 (816) and to pin 7 (820).

On step 232, a "low resistance" rule may be applied, in which if a first node has a certain potential, and a second node is connected to the first node by a resistor having low resistance, for example resistance below a predetermined value, such as 0.3Ω, then the potential of the second node may be assigned the same value as the potential of the first node.

Figure 9:
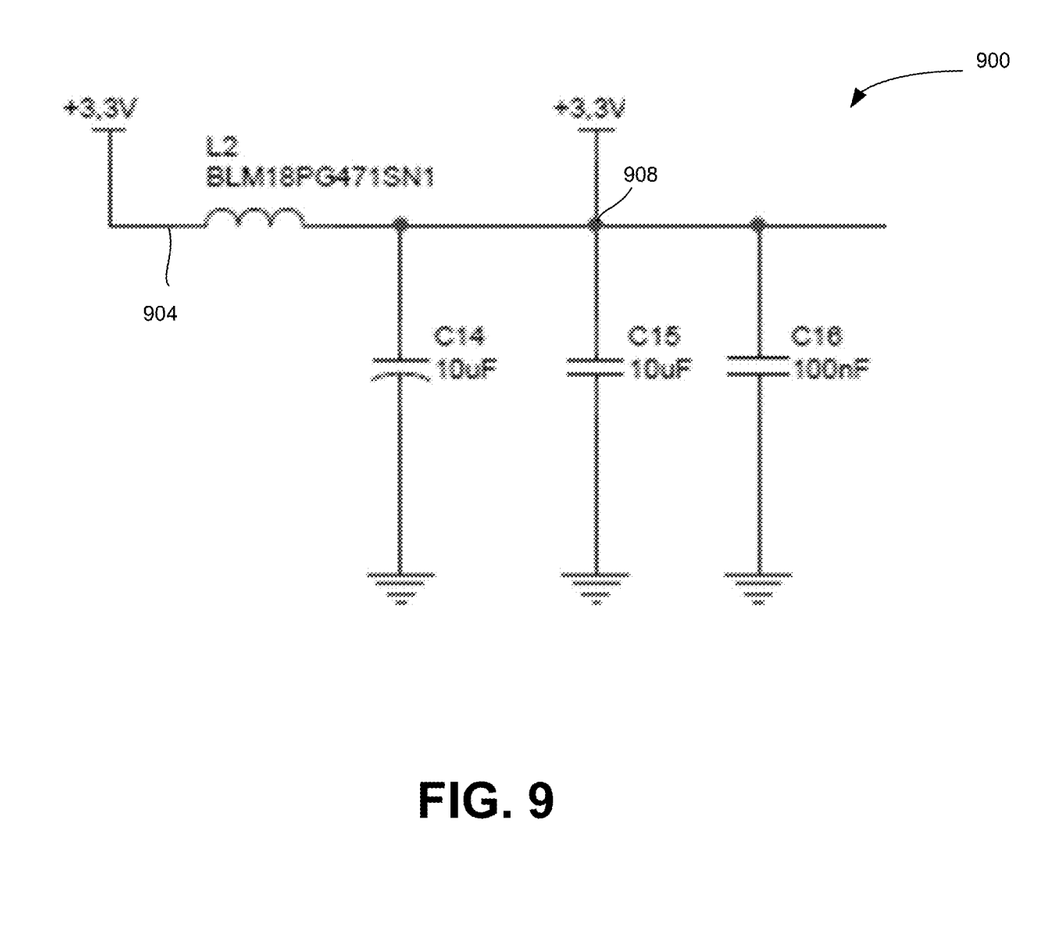
FIG. 9 shows a circuit fragment demonstrating application of the low resistance rule, in accordance with some exemplary embodiments of the disclosed subject matter.

Referring now to FIG. 9, showing a circuit fragment 900, in which node 904 having a potential of 3.3V is connected to node 908, then node 908 is also assigned a potential of 3.3V.

On step 236, the zero balance rule may be applied, in which the potential difference between two pins may be calculated as follows: given a component with two pins having known resistance therebetween wherein one of the pins is connected to a net having known potential, when all other currents through the node are known and assuming the sum of currents through a node is zero in accordance with Kirchhof $1^{st}$ law, the current through the component may be calculated, and hence the potential of the second pin.

On step 240, further rules may be applied. The rules may be specific and defined for a certain circuit, applicable to all circuits by one designer, globally used, or the like.

On step 244, the updated number of nodes having undefined potential may be determined, reflecting its value subsequent to the last iteration of the rule application, and compared to the temporary number of nodes.

On step 248, if the number of nodes having undefined potential is different then the latest iteration of applying the rules has been successful in determining the potential of one or more nodes, further changes may occur on a further iteration, and execution may return to step 204. If there is no change in the number of nodes, then the process may finish.

Figure 10:
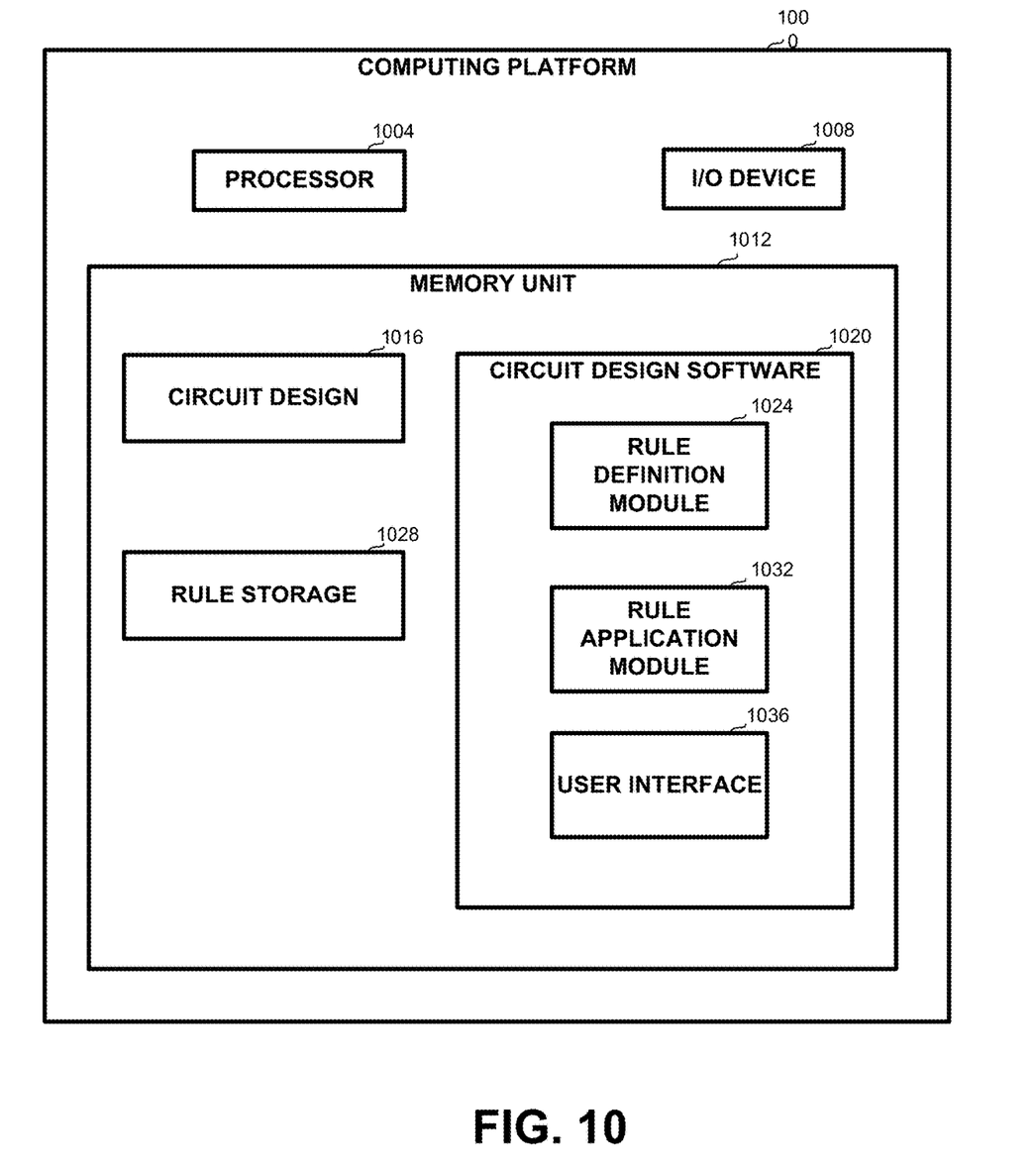
FIG. 10 is a block diagram of an apparatus for determining potential and electrical values in a circuit design, in accordance with some embodiments of the disclosure.

Referring now to FIG. 10, showing a block diagram of a computing platform 1000 for testing a multi-block circuit, in accordance with some exemplary embodiments of the disclosed subject matter.

In some exemplary embodiments computing platform 1000 may comprise a processor 1004, which may be a Central Processing Unit (CPU), a microprocessor, an electronic circuit, an Integrated Circuit (IC) or the like. Processor 1004 may be utilized to perform computations required by computing platform 1000 or any of its subcomponents. Processor 1004 may be configured to execute computer-programs useful in performing the method of FIG. 2 above.

In some exemplary embodiments, one or more I/O devices 1008 may be configured to receive input from and provide output to a user. In some exemplary embodiments, I/O devices 1008 may be utilized to present to the user a user interface, obtain user definitions for the rules, apply the rules and display the results. I/O devices 1008 may comprise a keyboard, a mouse, a touch screen or another pointing or tracking device, a voice activated device, or the like.

In some exemplary embodiments computing platform 1000 may comprise a memory unit 1012. Memory unit 1012 may be a short-term storage device or long-term storage device. Memory unit 1012 may be a persistent storage or volatile storage. Memory unit 1012 may be a disk drive, a Flash disk, a Random Access Memory (RAM), a memory chip, or the like. Memory unit 1012 may be a single memory device, or multiple interconnected memory devices which may be co-located or located in different locations and communicating via any communication channel.

In some exemplary embodiments, memory unit 1012 may retain program code operative to cause processor 1004 to perform acts associated with any of the subcomponents of computing platform 1000. In some exemplary embodiments, memory unit 1012 may retain program code operative to cause processor 1004 to perform acts associated with any of the steps shown in FIG. 2 above.

Memory unit 1012 may retain circuit design 1016 for one or more circuits. The circuit design may have been created using circuit design software 1020, imported from another storage device, or otherwise obtained. Circuit design 1016 may also be stored on a memory unit or a database associated with another computing platform, which is in communication with computing platform 1000. Circuit design 1016 may comprise the components and net definitions of a circuit. Circuit design 1016 may also comprise additional information, for example data sheets for the components. However, such additional data may be stored elsewhere and accessible to computing platform 1000.

The components detailed below may be implemented as one or more sets of interrelated computer instructions, executed for example by processor 1004 or by another processor. The components may be arranged as one or more executable files, dynamic libraries, static libraries, methods, functions, services, or the like, programmed in any programming language and under any computing environment.

Memory unit 1012 may retain circuit design software 1020, such as any CAD software, designed for editing circuits.

In addition to all conventional components of any CAD software, circuit design software 1020 may also comprise the components listed below for defining and applying one or more rules for predicting electrical values.

Circuit design software 1020 may retain rule definition module 1024 for defining one or more rules for predicting electrical values within an electronic circuit, such as the rules disclosed on FIGS. 2-9 above. In some embodiments, certain rules may be pre-defined, for example provided with the circuit design software, while other rules may be defined by a user, such as a rule for parsing net names.

Once rules are obtained or defined they may be stored within rule storage 1028.

Circuit design software 1020 may retain rule application module 1032 for applying the one or more rules defined by rule definition module 1024 or obtained from another source. The rules may be applied iteratively until no more changes are observed, wherein in each iteration the rules may be applied in a predetermined order, for example as indicated in FIG. 2 above.

Circuit design software 1020 may retain a user interface module 1036, configured to display a user interface and receive information from a user. For example, the user may use user interface 1036 to define one or more rules. For example, user interface 136 may display tables such as shown in FIGS. 3A, 4A, 5A, 6A, 7A and 8A above.

Following application of the rules, user interface 1036 may display a list of all determined electrical values, a list of nodes with no defined potential, statistics about the applied rules and number of iterations, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising
obtaining circuit information of at least a portion of a circuit design, the circuit information specifying a plurality of electronic components and a plurality of nets connecting pins of components from the plurality of components, the at least portion of the circuit design thereby associated with a plurality of nodes comprising the pins and connection points, and at least one ground node connected to a ground net;
obtaining a set of logical prediction rules and algorithms applicable to circuit designs;
parsing a name or technical data of a net from the plurality of nets for obtaining a voltage value, wherein a rule from the set of logical prediction rules and algorithms provides that a component pin connected to the net is defined as having electrical potential equal to the voltage value;
applying to the at least portion of the circuit design one or more rules or algorithms applicable to the at least portion of the circuit design from the set of logical prediction rules and algorithms, to obtain:
a predicted potential of at least one node, and at least one electrical value for at least one electronic component of the plurality of electronic components; and
outputting the predicted potential or the at least one electrical value predicted for the at least one electronic component.

2. The method of claim 1, further comprising repeating said applying until a number of nodes from the plurality of nodes having undefined predicted potential is not reduced by said applying.

3. The method of claim 1, wherein the one or more rules or algorithms are applied in predefined order.

4. The method of claim 1, further comprising assigning a zero potential to a component pin connected to the at least one ground node.

5. The method of claim 1, wherein a rule from the set of logical prediction rules and algorithms provides that a component pin connected to an input source or a component pin connected to a net including a connector pin that is connected to an input source is defined as having electric potential equal to a voltage of the input source.

6. The method of claim 1, wherein a rule from the set of logical prediction rules and algorithms provides that an input pin of a voltage regulator is defined as having electric potential equal to an input voltage.

7. The method of claim 1, wherein a rule from the set of logical prediction rules and algorithms provides that an output pin of a voltage regulator or a component pin connected to a net including an output pin of the voltage regulator is defined as having electric potential equal to an output voltage of the voltage regulator.

8. The method of claim 1, wherein a rule from the set of logical prediction rules and algorithms provides that a power pin of a power supply or a component pin connected to a net including a power pin of the power supply is defined as having electric potential equal to a power voltage.

9. The method of claim 1, wherein a rule from the set of logical prediction rules and algorithms provides that an input pin of a component or a component pin connected to a net including an input pin of the component is defined as having electrical potentials equal to an input voltage as stated in a data sheet of the component.

10. The method of claim 1, wherein a rule from the set of logical prediction rules and algorithms provides that an output pin of a component or a component pin connected to a net including an output pin of a component is defined as having electrical potentials equal to output voltage, as stated in a data sheet of the component.

11. The method of claim 1, wherein a rule from the set of logical prediction rules and algorithms provides that a component having low resistance between two pins implies that the two pins have a same electrical potential.

12. The method of claim 1, wherein a rule from the set of logical prediction rules and algorithms provides for:
calculating an electrical current through two pins of a component having known resistance therebetween, wherein a first pin of the two pins is connected to a net having assigned potential, by calculating other currents connected to pins of the net, and by assuming zero current balance of the net; and
calculating a potential at the second pin using the electrical current.

13. The method of claim 1, wherein a rule or algorithm from the set of logical prediction rules and algorithms provides for calculating electrical power by multiplying current and voltage.

14. A system having a processor, the processor being adapted to perform the steps of:
obtaining circuit information of at least a portion of a circuit design, the circuit information specifying a plurality of electronic components and a plurality of nets connecting pins of components from the plurality of components, the at least portion of the circuit design thereby associated with a plurality of nodes comprising the pins and connection points, and at least one ground node connected to a ground net;
obtaining a set of logical prediction rules and algorithms applicable to circuit designs;
parsing a name or technical data of a net from the plurality of nets for obtaining a voltage value, wherein a rule from the set of logical prediction rules and algorithms provides that a component pin connected to the net is defined as having electrical potential equal to the voltage value;
applying to the at least portion of the circuit design one or more rules or algorithms applicable to the at least portion of the circuit design from the set of logical prediction rules and algorithms, to obtain:
a predicted potential of at least one node, and at least one electrical value for at least one electronic component of the plurality of electronic components; and
outputting the predicted potential or the at least one electrical value predicted for the at least one electronic component.

15. The system of claim 14, wherein the processor is further adapted to repeat said applying until a number of nodes from the plurality of nodes having undefined predicted potential is not reduced by said applying.

16. The system of claim 14, wherein a rule from the set of logical prediction rules and algorithms provides for at least one item selected from the group consisting of:
a component pin connected to an input source or a component pin connected to a net including a connector pin that is connected to an input source is defined as having electric potential equal to a voltage of the input source;
an input pin of a voltage regulator is defined as having electric potential equal to an input voltage;
an output pin of a voltage regulator or a component pin connected to a net including an output pin of the voltage regulator is defined as having electric potential equal to an output voltage of the voltage regulator;
a power pin of a power supply or a component pin connected to a net including a power pin of the power supply is defined as having electric potential equal to a power voltage;
an input pin of a component or a component pin connected to a net including an input pin of the component is defined as having electrical potentials equal to an input voltage as stated in a data sheet of the component; and
an output pin of a component or a component pin connected to a net including an output pin of a component is defined as having electrical potentials equal to output voltage, as stated in a data sheet of the component; and
a component having low resistance between two pins implies that the two pins have a same electrical potential.

17. The system of claim 14, wherein a rule from the set of logical prediction rules and algorithms provides for:
calculating an electrical current through two pins of a component having known resistance therebetween, wherein a first pin of the two pins is connected to a net having assigned potential, by calculating other currents connected to pins of the net, and by assuming zero current balance of the net; and
calculating a potential at the second pin using the electrical current.

18. A computer program product comprising a computer readable storage medium retaining program instructions, which program instructions when read by a processor, cause the processor to perform a method comprising:
obtaining circuit information of at least a portion of a circuit design, the circuit information specifying a plurality of electronic components and a plurality of nets connecting pins of components from the plurality of components, the at least portion of the circuit design thereby associated with a plurality of nodes comprising the pins and connection points, and at least one ground node connected to a ground net;
obtaining a set of logical prediction rules and algorithms applicable to circuit designs;
parsing a name or technical data of a net from the plurality of nets for obtaining a voltage value, wherein a rule from the set of logical prediction rules and algorithms provides that a component pin connected to the net is defined as having electrical potential equal to the voltage value;
applying to the at least portion of the circuit design one or more rules or algorithms applicable to the at least portion of the circuit design from the set of logical prediction rules and algorithms, to obtain:
a predicted potential of at least one node, and at least one electrical value for at least one electronic component of the plurality of electronic components; and
outputting the predicted potential or the at least one electrical value predicted for the at least one electronic component.

* * * * *